Aug. 8, 1967 F. T. THOMPSON ETAL 3,335,228
PHOTOCONDUCTIVE MULTIPLEXING APPARATUS
Filed Nov. 6, 1963
2 Sheets-Sheet 1

WITNESSES:
Bernard R. Giegucz
Leon M. Garman

INVENTORS
Francis T. Thompson and
Lawrence S. Schmitz.
BY

PHOTOCONDUCTIVE MULTIPLEXING APPARATUS

Filed Nov. 6, 1963 2 Sheets-Sheet 2

United States Patent Office 3,335,228
Patented Aug. 8, 1967

3,335,228
PHOTOCONDUCTIVE MULTIPLEXING APPARATUS

Francis T. Thompson, Verona, and Lawrence S. Schmitz, Pittsburgh, Pa., assignors to Westinghouse Electric Corporation, Pittsburgh, Pa., a corporation of Pennsylvania
Filed Nov. 6, 1963, Ser. No. 321,970
7 Claims. (Cl. 179—15)

ABSTRACT OF THE DISCLOSURE

A photoconductive multiplexing circuit in which input signals are selected and applied through input photoconductive devices to an amplifier. The output of the amplifier is fed back through feedback photoconductive devices to the input photoconductive devices associated with those input signals not selected to thereby isolate the selected input. Both the input and the output photoconductive devices are scanned in a predetermined manner to obtain a high correlation between the output of the amplifier and the respective input signals.

The present invention relates to multiplexing apparatus, and more particularly to multiplexing apparatus using photoconductive elements to control the multiplexing operation.

The multiplexing of analog signals or digital signals from a multitude of input transducers is a necessary operation before presentation into computer circuitry in many control applications. The multiplexing of input signals presents serious problems especially at very low voltage levels. One method of multiplexing presently used is that of using pairs of mercury-wetted relays. The use of the mechanical relays presents the usual problem of failure and moreover limits the speed of scanning various input signals as well as having a relatively high cost per input. Another method suggested is applying the input signals directly through photoconductive or light sensitive devices to an amplifier. The photoconductive devices are scanned sequentially from a light source to permit the input signal to pass through the device illuminated to an amplifier, for example, and thus appear at the output of the amplifier. One end of each photoconductor is connected to a common point at the amplifier input. The non-illuminated photoconductors act in parallel to form a voltage divider with the illuminated photoconductor and therefore adversely affect the accuracy of the signal presented to the amplifier input.

Presently known photoconductive elements have an illuminated resistance of approximately 100 ohms. The unilluminated resistance may be of the order of $10^8$ ohms. Nonetheless, as the rate of scanning of the input photoconductors is increased, the slow recovery to the high resistance level of a previously illuminated photoconductor becomes troublesome. Assume, for example, that a different input photoconductor is sampled every 20 milliseconds and that each of the input photoconductors has an illuminated resistance of 100 ohms. The next previously sampled photoconductor will not have its completely recovered unilluminated resistance of $10^8$ ohms, but having been only sampled 20 milliseconds previously, will have only recovered to about $10^4$ ohms. The photoconductor scanned 40 milliseconds previously may have only recovered to $10^5$ ohms. Similarly previous photoconductors may have only recovered to $10^6$ or $10^7$ ohms having been scanned within the past 60 or 80 milliseconds. The previously scanned photoconductors are in parallel and form a shunt resistance to the particular photoconductor being scanned and thereby tend to load down the connecting point of the photoconductors at the input to the amplifier device. As the rate of scanning increases, the previously scanned photoconductors have less time to recover from their illuminated condition and therefore have a lower resistance which tends to provide a low resistance shunt to lessen the value of voltage applied to the input photoconductor being presently scanned; thus greatly and adversely affecting the accuracy of the multiplexing apparatus. Since the input analog signals are directly related to analog information coming from transducers picking up raw information, it is necessary that accuracy be maintained within very close limits.

It is therefore an object of the present invention to provide new and improved multiplexing apparatus having very high accuracy.

It is a further object of the present invention to provide photoconductive apparatus capable of operation with a high number of input signals and permitting rapid scanning.

It is a still further object of the present invention to provide new and improved photoconductive multiplexing apparatus which permits the use of the less closely controlled quality of photoconductors while still providing high accuracy.

Generally, the above-cited objects are accomplished by providing photoconductive multiplexing apparatus in which input signals are applied through input photoconductive devices to an amplifier. The output of the amplifier is fed back through feedback photoconductive devices to the input photoconductive devices. Both the input and output photoconductive devices are selectively scanned to attain high correlation between the output of the amplifier and the respective input signals.

These and other objects and advantages of the present invention will become more apparent when considered in view of the following specification and drawings, in which.

Figure 1:
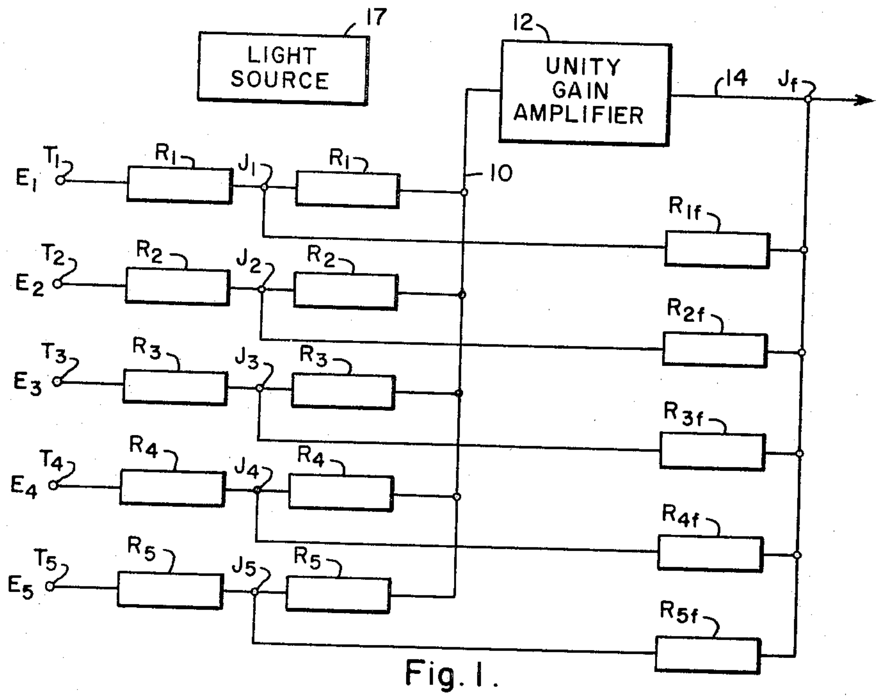
FIGURE 1 is a schematic diagram of one embodiment of the photoconductive multiplexing apparatus of the present invention.

Referring to FIG. 1, assume that five input signals $E_1$, $E_2$, $E_3$, $E_4$ and $E_5$ are low level DC analog voltages of positive polarity. These input signals, of course, could be of both polarities or be in binary or digital number form if desired. However, for purposes of example, the foregoing assumption is made. The input signals $E_1$, $E_2$, $E_3$, $E_4$ and $E_5$ are supplied respectively to input terminals $T_1$, $T_2$, $T_3$, $T_4$ and $T_5$. A pair of photoconductive elements $R_1$, $R_2$, $R_3$, $R_4$ and $R_5$ are connected respectively to the terminals $T_1$, $T_2$, $T_3$, $T_4$ and $T_5$ to receive the input signals $E_1$, $E_2$, $E_3$, $E_4$ and $E_5$, respectively. The elements $R_1$, $R_2$, $R_3$, $R_4$ and $R_5$ are referred herein as photoconductive elements, but may, of course, be radiation sensitive elements meeting the requirement that upon being illuminated or irradiated that the elements change to a low resistance, high conductive state and without illumination or irradiation have a high impedance low conductive state. The end opposite the input end of the photoconductive series pairs $R_1$, $R_2$, $R_3$, $R_4$ and $R_5$ are commonly connected to a lead 10, which is connected to a unity gain amplifier 12 to provide the input to the amplifier 12. The amplifier 12 has an output connection 14 where the multiplex signals may be supplied to external circuitry, usually an analog to digital converter when used in computer applications.

A feedback connection is provided with feedback photoconductive elements $R_{1f}$, $R_{2f}$, $R_{4f}$ and $R_{5f}$ being connected commonly at one end to a junction $J_f$ on the output lead 14 of the unity gain amplifier 12. The other end of the photoconductive elements $R_{1f}$, $R_{2f}$, $R_{3f}$, $R_{4f}$ and $R_{5f}$ is respectively connected to junctions $J_1$, $J_2$, $J_3$, $J_4$ and $J_5$, between the input photoconductor pairs $R_1$, $R_2$, $R_3$, $R_4$ and $R_5$.

A light source 17 is provided to permit the selective scanning of the various photoconductive elements, both input and feedback, to allow the input signals $E_1$, $E_2$, $E_3$, $E_4$ or $E_5$ to selectively appear at the output lead 14 of the unity gain amplifier 12. If, for example, the input $E_3$ were desired to be sampled and appear at the output terminal 14, the input photoconductive element $R_3$ would be illuminated with light from the light source 17. These elements then would go to their low resistance state to permit the input signal $E_3$ to be applied at the lead 10 to the amplifier 12. Assume that the scanning sequence is $E_1$, $E_2$ $E_3$, $E_4$, $E_5$, . . . At this time the other input photoconductors $R_1$, $R_2$, $R_4$ and $R_5$ do not receive light from the light source 17 but are recovering having previously been scanned, $E_2$ having just previously been scanned. If the photoconductive elements are being scanned at a rate of 20 milliseconds and if the illuminated resistance is 100 ohms for the element $R_3$, the just previously scanned element $R_2$ may have resistance of about $10^4$ ohms, while the element $R_1$ may have a resistance of the order of $10^5$ ohms. If there were no feedback connections, it may be seen that the voltage level at the input to the amplifier 12 would be substantially altered by the parallel combination of the resistors $R_1$, $R_2$, $R_4$ and $R_5$ which present a relatively low shunt resistance to the illuminated element $R_3$. This would be due to the fact that all of the unilluminated elements may not have completely recovered to their high resistance state of the illuminated photoconductors $R_3$. The accuracy of the input signal $E_3$ as applied to the terminals $T_3$ would thus be degraded so that an accurate representation would not appear at the lead 10 at the input of the unity gain amplifier 12.

During the time that the input $E_3$ is being sampled, the feedback photoconductor $R_{3f}$, in the same row as the input photoconductors $R_3$, does not receive light but is blocked from receiving light and is thus in its high resistance state. Therefore, very little feedback voltage is applied to the junction $J_3$ between the photoconductors $R_3$. However, during this same time, the other feedback resistors $R_{1f}$, $R_{2f}$, $R_{4f}$ and $R_{5f}$ are all illuminated and thus are in their low resistance state of approximately 100 ohms. The output voltage of the amplifier 12, which is substantially the same as its input, is fed back through the feedback photoconductors to the junctions $J_1$, $J_2$, $J_4$ and $J_5$ between the elements $R_1$, $R_2$, $R_4$ and $R_5$. With this feedback voltage being applied, the input elements $R_1$, $R_2$, $R_4$ and $R_5$ draw very little current from the input signal $E_3$. Thus, there is very little voltage difference between the lead 10 and the junction joints $J_1$, $J_2$, $J_3$ and $J_4$. By such a connection, the voltage divider effect is largely compensated for and thereby greatly increases the accuracy of the circuit. Hence, there should be high correspondence between the magnitude of the input signal $E_3$ appearing at the terminal $T_3$ and the magnitude of the signal after being applied to the photoconductors $R_3$ to the lead 10. This is true even in the worst possible case with the other input signals $E_1$, $E_2$, $E_4$ and $E_5$ being at ground potential.

Figure 2:
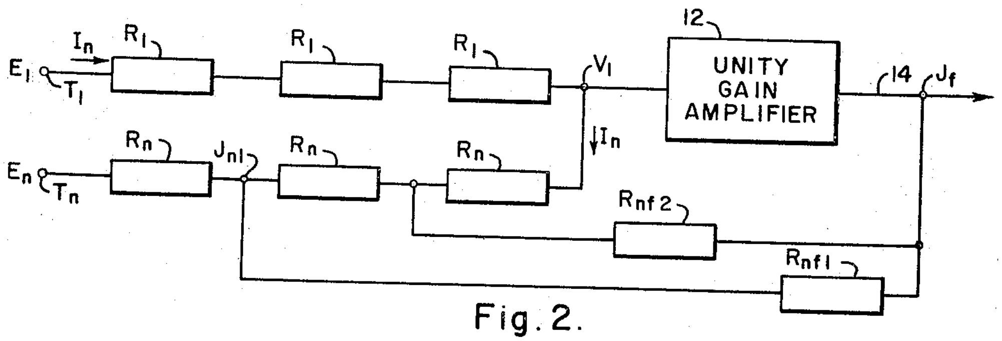
FIG. 2 is a simplified-schematic diagram used to aid in the explanation of the operation of the present invention.

That a feedback system provides greatly improved accuracy over a no-feedback system and that additional feedback loops may even increase the accuracy of the system, may be better seen from the following analysis with reference to FIG. 2. Here only two inputs $E_1$ and $E_n$ are shown for simplicity. There are three input photoconductors $R_1$ and $R_n$ in each input connected in series. The last elements of the series connection have one end commonly connected and also connected to the unity gain amplifier 12. Two feedback connections, however, are shown. One feedback loop is provided by a feedback photoconductive element $R_{nf1}$, connected between a junction $J_{n1}$, between one pair of input elements $R_n$, and a junction $J_f$ at the output 14 of the amplifier 12. The second feedback loop is provided by a feedback photoconductive element $R_{nf2}$ connected between a junction $J_{n2}$, between another pair of input elements $R_n$, and the junction $J_f$ at the output 14. No-feedback connections are shown between the elements $R_1$, since at this time it is assumed that the input elements $E_1$ is being sampled with the photoconductive elements $R_1$ being illuminated and in their low resistance state and with their feedback elements being in a high resistive state and therefore supplying negligible feedback voltage to these elements. On the other hand, the input $E_n$ is in its unilluminated state but the feedback photoconductive elements $R_{nf1}$ and $R_{nf2}$ are illuminated and in their low resistance states and therefore provide feedback voltage to the junctions $J_{n1}$ and $J_{n2}$. To consider the case when the greatest error would occur with, the input $E_n$ applied to the terminal $T_n$ is assumed to be at a zero or ground potential.

Then writing the circuit equations:

$$V_1=I_n\left[3R_n+2R_n\left(\frac{R_n}{R_{nf}}\right)+R_n\frac{(R_n^2+2R_nR_{nf})}{R_{nf}^2}\right]$$

where $R_{nf}=R_{nf1}=R_{nf2}$

Simplifying this:

$$V_1=\frac{I_n}{R_{nf}^2}(3R_nR_{nf}^2+4R_n^2R_{nf}+R_n^3)$$

The per unit deviation of the voltage $V_1$ at the input to the amplifier 12 from the input signal $E_1$ for $n$ feedback loops is:

$$Q_{nf}=\frac{E_1-V_1}{E_1}$$

If we assume $V_1 \cong E_1$ this equation may be written:

$$Q_{nf}=3R_1\sum_1^n\frac{I_n}{V_1}$$

$$Q_{nf}=3R_1\sum_1^n\frac{R_{nf}^2}{R_n(R_n+3R_{nf})(R_n+R_{nf})}$$

If we then assume:

$$R_n>>R_{nf}$$

which should be the case with the elements $R_{nf1}$ and $R_{nf2}$ being illuminated when $R_1$ is scanned.

The per unit deviation $Q_{DF}$ for double feedback is:

$$Q_{DF}=\frac{E_1-V_1}{E_1}=3R_1\sum_1^n\frac{R_{nf}^2}{R_n^3}$$

Assuming that most of the loading will be done by the input photoconductive devices $R_o$ of the next adjacent row to the input $E_1$, which have been illuminated next previously to the input $E_1$.

The double feedback deviation is then:

$$Q_{DF}=\frac{3R_1R_{nf}^2}{R_o^3}=3\left(\frac{R_{nf}}{R_1}\right)^2\left(\frac{R_1}{R_o}\right)^3$$

Without feedback the deviation $Q_{OF}$ would reduce to $$Q_{OF}=\frac{R_1}{R_o}$$

The single feedback deviation would be $$R_{SF}=2\frac{R_{nf}}{R_1}\left(\frac{R_1}{R_o}\right)^2$$

For $n$ feedback loops this can be generalized to give the $n$ loop deviation $Q_{nf}$ of:

$$Q_{nf}=(n+1)R_1\sum_1^n\frac{R_{nf}^n}{R_nn+1}$$

Experimentally it has been found that commercially available photoconductors being scanned at the rate of 128 inputs per second give the ratios:

$$\frac{R_{nf}}{R_1}=\frac{1}{7}, \text{ and } \frac{R_1}{R_o}=\frac{1}{60}$$

so that the no feedback deviation would be:

$$Q_{SF}=\frac{1}{12600}$$

while the double feedback deviation reduces to:

$$Q_{DF}=\frac{1}{3528000}$$

It can therefore be readily seen from the above example that greatly improved efficiency is provided over the no-feedback circuit by the use of a single feedback circuit. Moreover, an even more accurate circuit is provided by the double feedback circuit.

Figure 3:
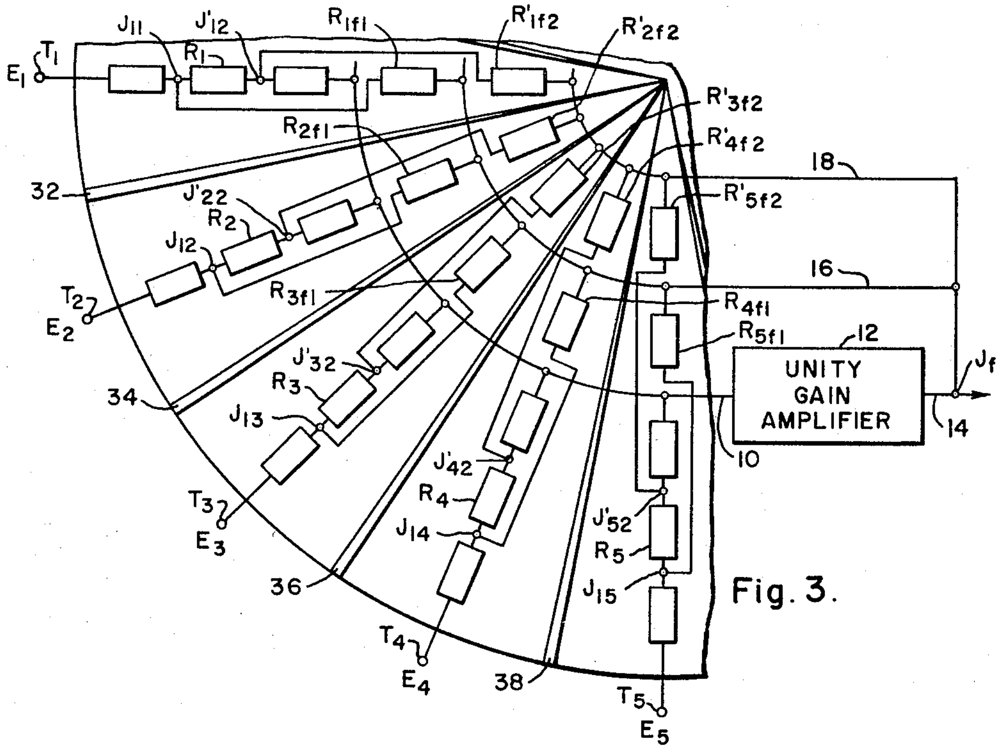
FIG. 3 is a schematic-layout diagram of another embodiment of the present invention.

In FIG. 3 is shown a double feedback multiplexing circuit with the rows of photoconductive elements being arranged in a circular array. Only one quadrant of the sixteen-input array is shown for the sake of simplicity. Of course, in actual application, many more inputs could be utilized. The five inputs $E_1$, $E_2$, $E_3$, $E_4$ and $E_5$ are applied to the terminals $T_1$, $T_2$, $T_3$, $T_4$ and $T_5$, respectively. The inputs are then applied through the three series connected photoconductive elements $R_1$, $R_2$, $R_3$, $R_4$ and $R_5$, respectively, to the lead 10. The input to the unity gain amplifier 12 is supplied from the signals appearing on the lead 10. The output of the amplifier 12 is connected to two feedback loops 16 and 18. One feedback loop 16 includes photoconductive elements $R_{1f1}$–$R_{5f1}$, which in turn, are connected to the junctions $J_{11}$, $J_{12}$, $J_{13}$, $J_{14}$ and $J_{15}$. The other feedback loop 18 is connected through the photoconductive elements $R'_{1f2}$–$R'_{5f2}$, which in turn are connected to the junctions $J'_{12}$, $J'_{22}$, $J'_{32}$, $J'_{42}$ and $J'_{52}$. Separators 32, 34, 36 and 38 are placed between the various rows of photoconductors to isolate the rows in case the scanning light source does not supply a parallel light beam.

Figure 4:
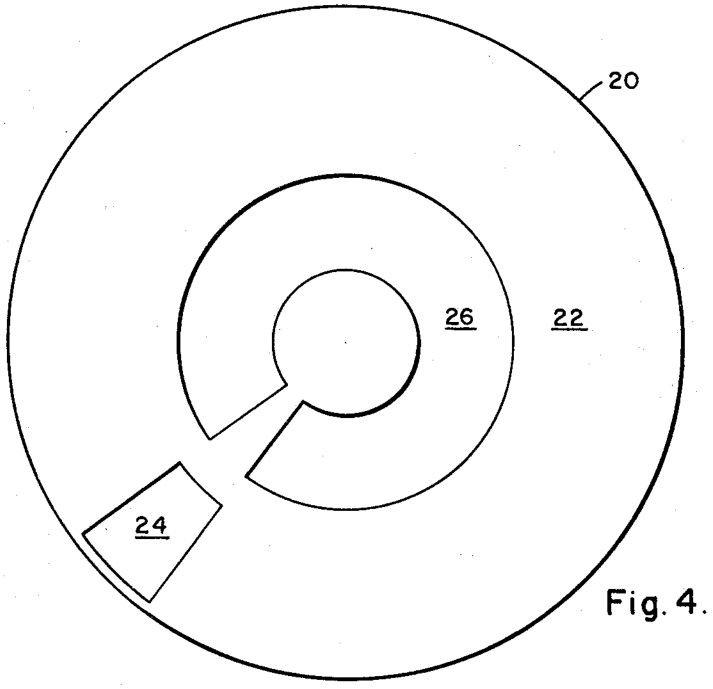
FIG. 4 is a plan view of a scanning device to be used with the embodiment of FIG. 3.

Referring also now to FIG. 4, a scanning device having a disc-shaped mask 20 has the opaque regions 22 and two cutout regions 24 and 26. The mask 20 is placed directly overtop of the circular array of FIG. 3. A source of light, such as an incandescent or sealed beam light, is placed above the mask 20. The mask 20 is then rotated at the speed at which it is desired to sample the input signals $E_1$, $E_2$, $E_3$, etc. The cutout opening 24 in the mask 20 is large enough only to illuminate one row at a time of the input photoconductive elements $R_1$, $R_2$, $R_3$, etc. With sixteen elements in the circular array, if a time period of rotation of 320 milliseconds is selected, every 20 millisecond one input row of photoconductive elements would be scanned. The other cutout 26 in the mask 20 is larger and permits all of the feedback photoconductive elements $R_{1f}$, $R_{2f}$, $R_{3f}$, etc. to be illuminated except the one row of feedback elements of the particular row being scanned. In the present example, where the input $E_3$ is being exampled, the feedback elements $R_{3f1}$ and $R'_{3f2}$ would be masked from receiving illumination and thus would be in their high impedance state. Thus, as the mask 20 rotates, each of the input rows of photoconductive elements $R_1$, $R_2$, $R_3$, etc. would be illuminated to go to its low conductive state. All of the feedback photoconductors would be illuminated except the row of feedback elements being sampled and thus would provide feedback signals to the input photoconductive elements of the unscanned rows. The feedback signals, as explained above, would maintain the potential levels at the input photoconductive elements at a relatively high level and therefore block current from passing through these elements. Even in the worst case with the unscanned input signals being at ground potential layer, the input elements would be at high voltage to prevent current from flowing through the input elements and thus drag down the potential on the input lead 10. With the two feedback loops 16 and 18 maintaining the potential at points in the unscanned rows of input photoconductive elements, an input signal appearing at any of the input terminals being scanned will appear at substantially the same amplitude at the input lead 10 and thereby provide high correlation between the input analog signal and the signal actually applied to the unity gain amplifier 12; so providing high accuracy of the multiplexing function.

The annular array as presented in FIGS. 3 and 4 provides an inexpensive way of providing the multiplexing unit by depositing photoconductive material and interconnections on one board. Such fabricating procedures may produce some cells that are not of equal quality as others. However, because of the improved accuracy of the double or multiple feedback circuits, this disadvantage will not be serious from an accuracy standpoint. Another advantage of utilizing feedback circuits is that poor light sources may be used because of the high accuracy of the double or multiple feedback circuits and therefore a less expensive overall multiplexer unit may be produced and while still maintaining high accuracy standards.

The above examples have shown sequential sampling of input signals. However, it should be noted that a random sampling of input signals could be readily employed. This would be accomplished by providing a radiation source for each set of input and feedback photoconductors. To provide the random access of a given input signal, the associated set of input photoconductors and all the feedback photoconductors, with the exception of the chosen row of feedback photoconductors, would be illuminated. The input signal would appear at the output in accordance with its random selection by the scanning apparatus.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. In multiplexer apparatus operative with a plurality of input signals, the combination of: a plurality of input means each receiving one of said input signals; signal translating means; at least one light sensitive means associated with each of said input means and responsive to radiation to change its conductive state and being operatively connected respectively between the input of said translating means and one of said plurality of input means; a plurality of feedback loops each cooperative with a respective input means and each of said feedback loops including a light sensitive element and being operatively connected between the output of said translating means and at least one of said light sensitive means; and scanning means operative to irradiate selectively the light sensitive means of one selected input means associated with one of said feedback loops and the light sensitive elements associated with the other feedback loops so that there is high accuracy in transmitting said input signals to appear at the output of said translating means.

2. In multiplexer apparatus operative with a plurality of input signals, the combination of: a plurality of input means each receiving one of said input signals; signal translating means; first radiation sensitive means each being responsive to radiation to change its conductive state and being operatively connected between the input of said translating means and each one of said plurality of input means; second radiation sensitive means responsive to radiation to change its conductive state and being operatively connected in feedback loops between the output of said translating means and said first radiation sensitive means; and scanning means to irradiate selectively said first and second radiation sensitive means in a predetermined mode so that there is high accuracy in transmitting said input signals to appear at the output of said translating means.

3. In multiplexer apparatus operative with a plurality of input signals, the combination of: a plurality of input means each receiving one of said input signals; signal translating means; a plurality of photoconductive means, with each plurality being operatively connected between the input of said translating means and one of said plurality of input means; feedback loops each cooperative with a respective plurality of photoconductive means and being operatively connected between the output of said translating means and at least one of said first plurality of photoconductive means to provide a feedback voltage to said photoconductive means; and scanning means operative to irradiate selectively one of said plurality of photoconductive means and to inhibit feedback voltage associated with said irradiated photoconductive means so that there is a high correlation between the amplitudes of said input signals appearing at said input means and at the input to said translating means.

4. In multiplexer apparatus operative with a plurality of input signals, the combination of: a plurality of input means each receiving one of said input signals; translating means; a first plurality of photoconductive means each being responsive to radiation to change its conductive state, with each plurality being operatively connected between the input of said translating means and one of said plurality of input means; a second plurality of photoconductive means responsive to radiation to change its conductive state and being operatively connected in associated feedback loop between the output of said translating means and said first plurality of photoconductive means; and scanning means operative to irradiate selectively one of said first and other second plurality of photoconductive light sensitive means so that there is high correlation between the amplitudes of said input signals appearing at said input means and at the input to said translating means.

5. In multiplexer apparatus operative with a plurality of input signals, the combination of: a plurality of input terminals each receiving separately one of said input signals; amplifying means having input and output terminals and to provide at the output terminals said input signals in a predetermined sequence; a plurality of input photoconductive devices arranged in a plurality of rows, each of said plurality of input photoconductive devices being operatively connected between the input terminal of said amplifying means and one of said plurality of input terminals; a feedback photoconductive device connected in at least one feedback loop between the output terminal of said amplifying means and at least one of said plurality of input photoconductive devices; and scanning means operative to irradiate selected rows of said input photoconductive devices while not irradiating selected ones of said feedback photoconductive devices so that there is high accuracy in multiplexing said input signals.

6. In multiplexer apparatus operative with a plurality of input signals, the combination of: a plurality of input terminals each receiving separately one of said input signals; amplifying means having input and output terminals and to provide at the output terminals said input signals in a predetermined sequence; a plurality of input photoconductive devices connected in series and arranged in a plurality of rows, each of said plurality of input photoconductive means being operatively connected between the input terminal of said amplifying means and one of said plurality of input terminals; a plurality of feedback photoconductive devices each being connected in a feedback loop between the output terminal of said amplifying means and between said series connected photoconductive devices of said plurality of input photoconductive devices, each of said feedback photoconductive devices being connected between different ones of said input photoconductive devices and being disposed in the row of input devices to which the associated feedback loop is connected; and scanning means operative to irradiate selected rows of said input photoconductive devices while not irradiating the feedback photoconductive devices of the same rows so that there is a high correlation between the amplitude of signals appearing at the input terminal of the row irradiated compared to the signal applied at the input terminal of said amplifying means.

7. In multiplexer apparatus operative with a plurality of input signals, the combination of: a plurality of input terminals each receiving separately one of said input signals; amplifying means having input and output terminals and to provide at the output terminals said input signals in a predetermined sequence; a plurality of input photoconductive devices connected in series and arranged in a plurality of rows, each of said plurality of input photoconductive means being operatively connected between the input terminal of said amplifying means and one of said plurality of input terminals; a plurality of feedback photoconductive devices each connected in a feedback loop between the output terminal of said amplifying means and between said series connected input photoconductive devices in the same row, each of said feedback photoconductive devices being connected between different ones of said input photoconductive devices; and scanning means operative to irradiate selectively a row of said input photoconductive devices the input signal to which is desired to appear at the output terminal of said amplifying means while not irradiating the feedback photoconductive devices associated with that row of input photoconductive devices so that there is a high correlation between the amplitude of signals appearing at the input terminal of the row irradiated compared to the signal applied at the input terminal of said amplifying means.

References Cited

UNITED STATES PATENTS

| | | | |
|---|---|---|---|
| 2,723,310 | 11/1955 | Frum | 179—15 |
| 2,951,903 | 9/1960 | De Vrijer | 179—15 |
| 3,026,416 | 3/1962 | Weimer | 250—211 |
| 3,059,116 | 10/1962 | Robertson | 250—209 |
| 3,145,301 | 8/1964 | Spruth | 250—213 |
| 3,167,722 | 1/1965 | Weller | 330—59 |
| 3,225,304 | 12/1965 | Richards | 330—59 |

JOHN W. CALDWELL, *Acting Primary Examiner.*

ROBERT L. GRIFFIN, *Examiner.*